US012615175B2

(12) United States Patent
Zhang et al.

(10) Patent No.: US 12,615,175 B2
(45) Date of Patent: Apr. 28, 2026

(54) SYSTEM AND METHOD FOR REFERENCE SIGNALING DESIGN AND CONFIGURATION

(71) Applicant: ZTE CORPORATION, Shenzhen (CN)

(72) Inventors: Shujuan Zhang, Shenzhen (CN); Zhaohua Lu, Shenzhen (CN); Bo Gao, Shenzhen (CN); Chuangxin Jiang, Shenzhen (CN); Shijia Shao, Shenzhen (CN); Yang Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 364 days.

(21) Appl. No.: 18/134,315

(22) Filed: Apr. 13, 2023

(65) Prior Publication Data

US 2023/0246893 A1      Aug. 3, 2023

Related U.S. Application Data

(63) Continuation of application No. PCT/CN2020/121482, filed on Oct. 16, 2020.

(51) Int. Cl.
| | |
|---|---|
| *H04L 27/26* | (2006.01) |
| *H04J 11/00* | (2006.01) |
| *H04L 5/00* | (2006.01) |
| *H04W 28/02* | (2009.01) |
| *H04W 52/32* | (2009.01) |
| *H04W 52/36* | (2009.01) |

(Continued)

(52) U.S. Cl.
CPC ........ *H04L 27/2613* (2013.01); *H04L 5/0051* (2013.01)

(58) Field of Classification Search
CPC .......................... H04L 27/2613; H04L 5/0051
USPC .......................................................... 370/336
See application file for complete search history.

(56) References Cited

U.S. PATENT DOCUMENTS

| | | |
|---|---|---|
| 2009/0239533 A1 | 9/2009 | Somasundaram et al. |
| 2018/0192426 A1 | 7/2018 | Ryoo et al. |

(Continued)

FOREIGN PATENT DOCUMENTS

| | | |
|---|---|---|
| CN | 110035441 A | 7/2019 |
| CN | 110535545 A | 12/2019 |

(Continued)

OTHER PUBLICATIONS

International Search Report and Written Opinion for PCT Appl. No. PCT/CN2020/121482, mailed Jul. 19, 2021 (14 pages).

(Continued)

*Primary Examiner* — Xuan Lu

(74) *Attorney, Agent, or Firm* — Foley & Lardner LLP

(57) ABSTRACT

A system and method for wireless communication are disclosed herein. In one embodiment, a method performed by a wireless communication device includes receiving a downlink signaling indicating a power offset between a power of a synchronization signal and a power for a Channel State Information-Reference Signal (CSI-RS), and determining information of the synchronization signal. In another embodiment, a method performed by a wireless communication device includes receiving a downlink signaling indicating information of a mobility measurement reference signal resource, where the information includes at least one of power information or repetition information.

12 Claims, 9 Drawing Sheets

(51) Int. Cl.
  *H04W 56/00* (2009.01)
  *H04W 72/23* (2023.01)

(56) References Cited

U.S. PATENT DOCUMENTS

| | | | |
|---|---|---|---|
| 2018/0317114 A1 | 11/2018 | Kim et al. | |
| 2019/0045559 A1 | 2/2019 | Huang et al. | |
| 2019/0174466 A1* | 6/2019 | Zhang | H04L 5/0057 |
| 2019/0253904 A1 | 8/2019 | Tsai et al. | |
| 2020/0045745 A1 | 2/2020 | Cirik et al. | |
| 2020/0145983 A1* | 5/2020 | Levitsky | H04L 5/0053 |
| 2020/0280940 A1* | 9/2020 | Kim | H04J 11/0086 |
| 2021/0144742 A1* | 5/2021 | Jeon | H04W 74/0833 |
| 2021/0195608 A1* | 6/2021 | Wu | H04B 17/309 |
| 2022/0104147 A1* | 3/2022 | Cui | H04W 52/243 |
| 2023/0189177 A1* | 6/2023 | Chen | H04B 7/0626 370/503 |
| 2023/0370918 A1* | 11/2023 | Maleki | H04W 48/20 |

FOREIGN PATENT DOCUMENTS

| | | | |
|---|---|---|---|
| CN | 110740500 A | 1/2020 | |
| CN | 111713033 A | 9/2020 | |
| EP | 3 826 377 A1 | 5/2021 | |
| TW | 202010341 A | 3/2020 | |
| TW | 202010353 A | 3/2020 | |
| WO | WO-2020/015628 A1 | 1/2020 | |
| WO | WO-2020/033887 A1 | 2/2020 | |
| WO | WO-2021067921 A1 * | 4/2021 | H04L 1/0015 |

OTHER PUBLICATIONS

Office Action for KR Appl. No. 10-2023-7013072, dated Feb. 27, 2024 (with English translation, 9 pages).

Futurewei, "Enhancement on multi-beam operation", 3GPP TSG RAN WG1 #102-e, R1-2005290, Aug. 28, 2020, R1-2005290, e-Meeting (4 pages).

Lenovo et al., "Enhancements on Multi-beam Operation", 3GPP TSG RAN WG1#103-e, R1-2008910, Nov. 13, 2020, e-Meeting (10 pages).

Moderator (Vivo), "Feature lead summary on Enhancements on Multi-TRP inter-cell operation", 3GPP TSG RAN WG1 #102-e, R1-2007313, Aug. 28, 2020, e-Meeting (14 pages).

NTT DOCOMO Inc, "Discussion on inter-cell multi-TRP operations", 3GPP TSG RAN WG1 #102-e, R1-2006720, Aug. 28, 2020, e-Meeting (3 pages).

Qualcomm Incorporated, "Enhancements on Multi-beam Operation", 3GPP TSG RAN WG1 Meeting #102-e, R1-2006790, Aug. 28, 2020 (7 pages).

Qualcomm Incorporated, "Enhancements on Multi-beam Operation", 3GPP TSG RAN WG1 Meeting #103-e, R1-2009250, Nov. 13, 2020 (12 pages).

Vivo, "Discussion on multi-beam enhancement", 3GPP TSG RAN WG1 #102-e, R1-2005363, Aug. 28, 2020, e-Meeting (21 pages).

Vivo, "Further discussion on inter-cell MTRP operation", 3GPP TSG RAN WG1 #103, R1-2007646, Nov. 13, 2020, e-Meeting (8 pages).

Vivo, "Further discussion on multi beam enhancement", 3GPP TSG RAN WG1 #103-e, R1-2007644, Nov. 13, 2020, e-Meeting (26 pages).

Extended European Search Report on EP Appln No. 20957212.2, dated Nov. 2, 2023 (8 pages).

Communication pursuant to Article 94(3) EPC for EP Appl. No. 20957212.2, dated Nov. 25, 2025 (7 pages).

Office Action for CA Appl. No. 3,198,448 dated Aug. 29, 2025 (4 pages).

* cited by examiner

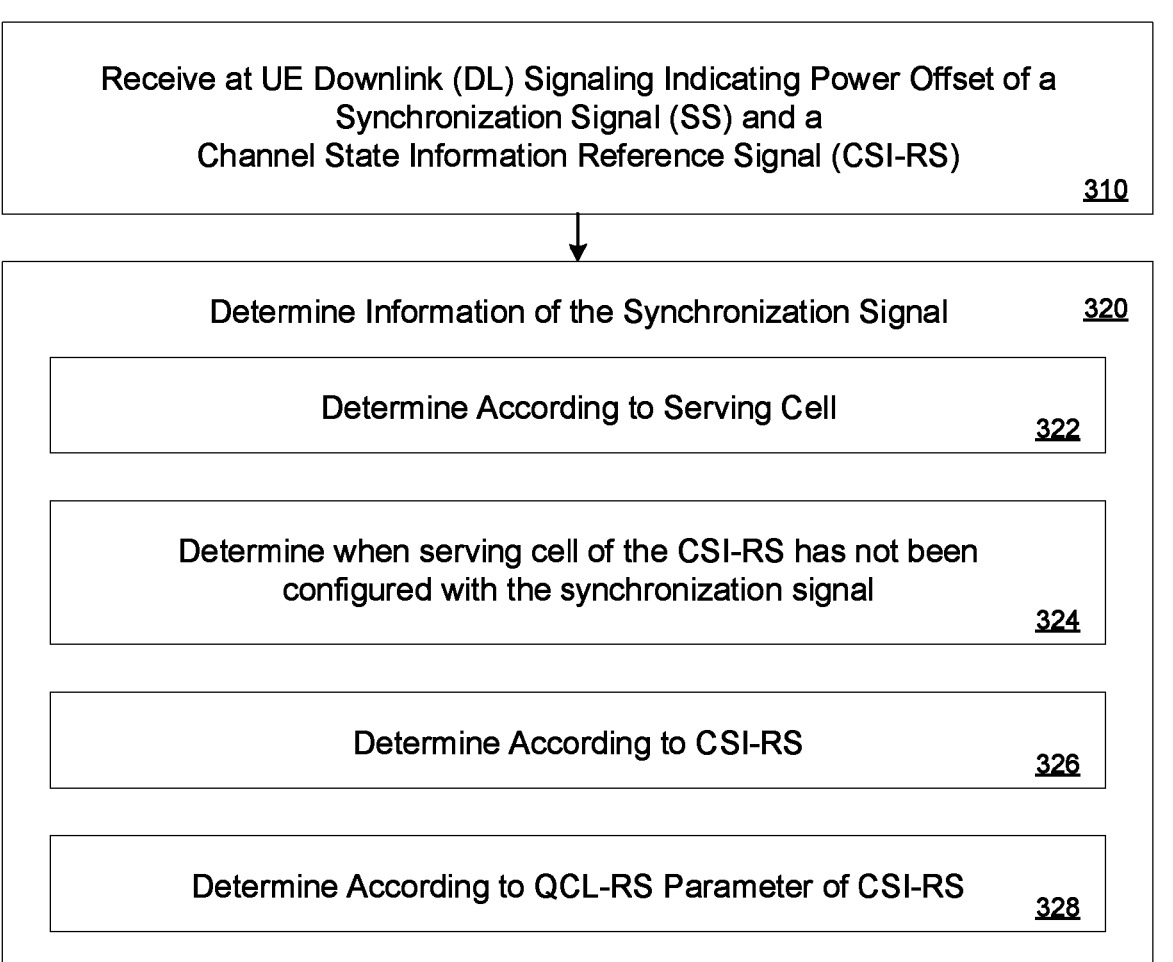

300

Receive at UE Downlink (DL) Signaling Indicating Power Offset of a
Synchronization Signal (SS) and a
Channel State Information Reference Signal (CSI-RS)

310

Determine Information of the Synchronization Signal     320

Determine According to Serving Cell

322

Determine when serving cell of the CSI-RS has not been
configured with the synchronization signal

324

Determine According to CSI-RS

326

Determine According to QCL-RS Parameter of CSI-RS

Figure 4:
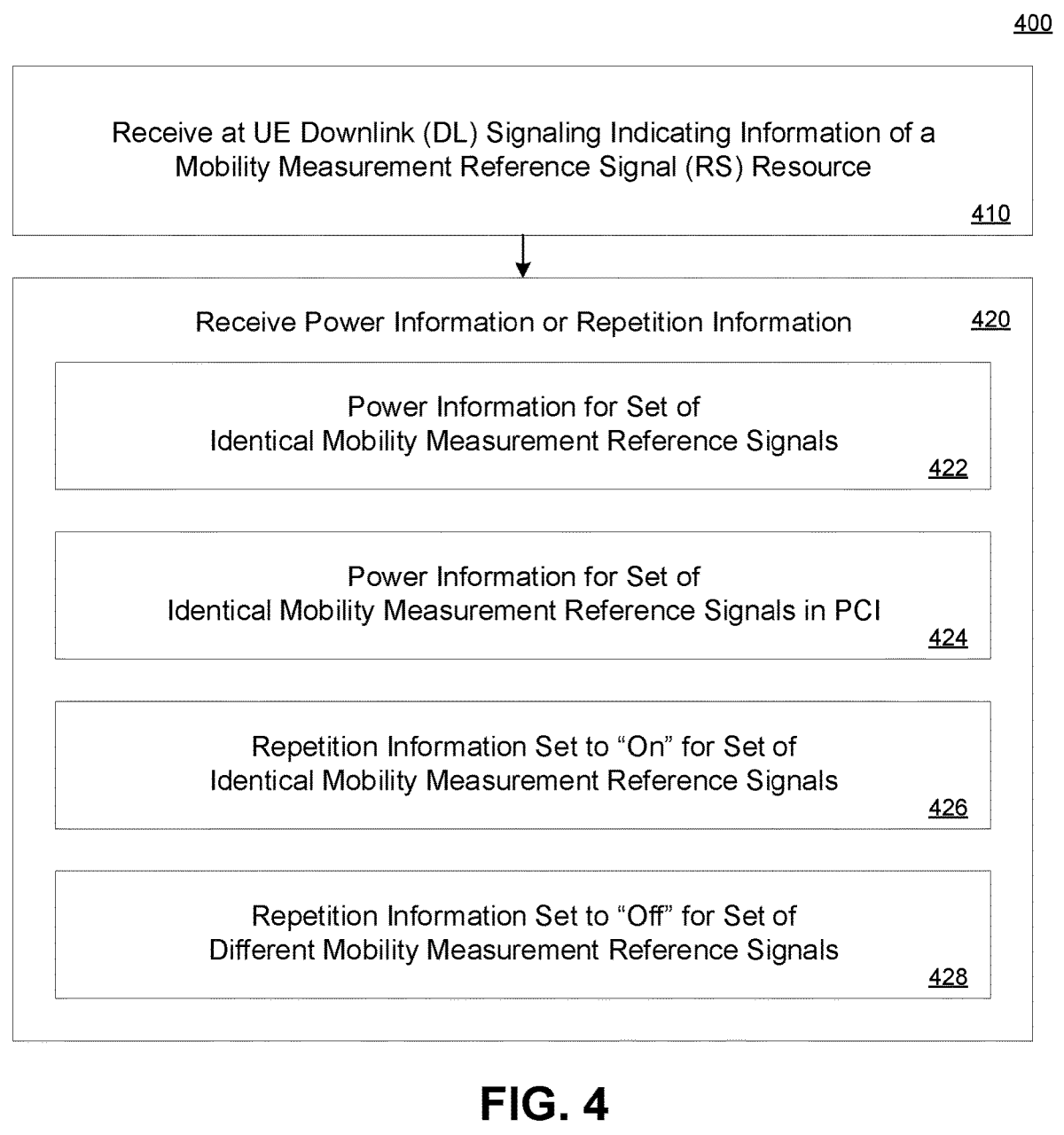

Receive at UE Downlink (DL) Signaling Indicating Information of a
Mobility Measurement Reference Signal (RS) Resource

410

Receive Power Information or Repetition Information    420

Power Information for Set of
Identical Mobility Measurement Reference Signals

422

Power Information for Set of
Identical Mobility Measurement Reference Signals in PCI

424

Repetition Information Set to "On" for Set of
Identical Mobility Measurement Reference Signals

426

Repetition Information Set to "Off" for Set of
Different Mobility Measurement Reference Signals

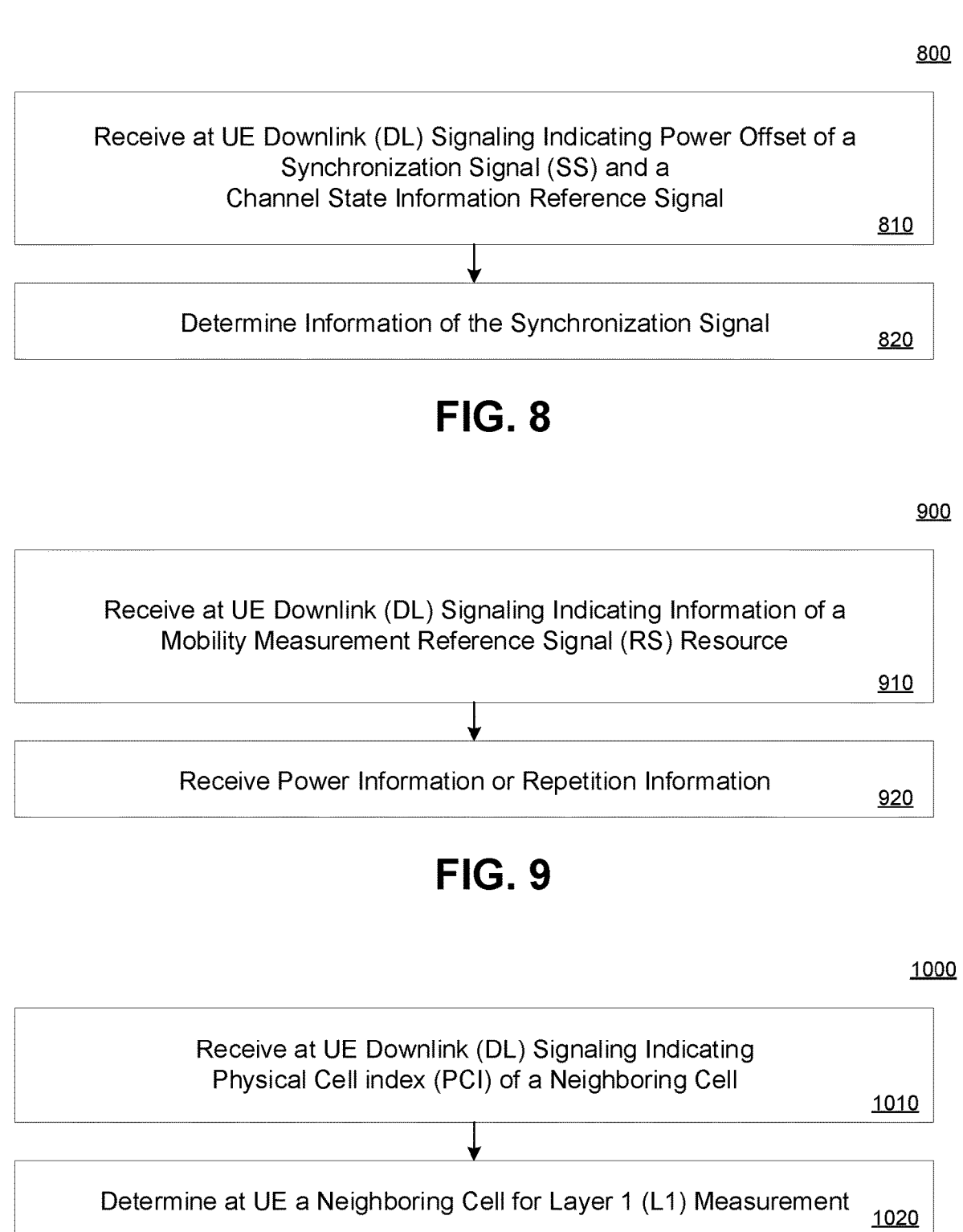

800

Receive at UE Downlink (DL) Signaling Indicating Power Offset of a
Synchronization Signal (SS) and a
Channel State Information Reference Signal
810

Determine Information of the Synchronization Signal
820

Receive at UE Downlink (DL) Signaling Indicating Information of a
Mobility Measurement Reference Signal (RS) Resource
910

Receive Power Information or Repetition Information
920

Receive at UE Downlink (DL) Signaling Indicating
Physical Cell index (PCI) of a Neighboring Cell
1010

Determine at UE a Neighboring Cell for Layer 1 (L1) Measurement
1020

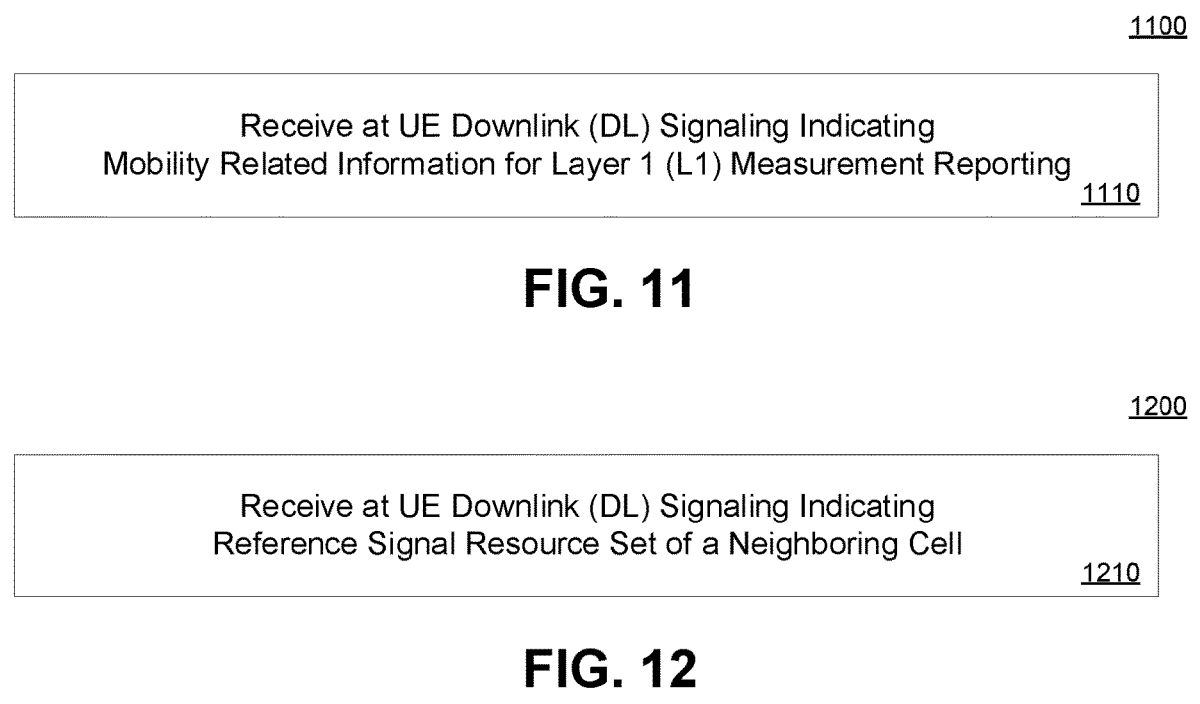

Receive at UE Downlink (DL) Signaling Indicating
Mobility Related Information for Layer 1 (L1) Measurement Reporting
1110

Receive at UE Downlink (DL) Signaling Indicating
Reference Signal Resource Set of a Neighboring Cell
1210

FIG. 12

SYSTEM AND METHOD FOR REFERENCE SIGNALING DESIGN AND CONFIGURATION

CROSS-REFERENCE TO RELATED APPLICATION

This application claims the benefit of priority under 35 U.S.C. § 120 as a continuation of International Patent Application No. PCT/CN2020/121482, filed on Oct. 16, 2020, the disclosure of which is incorporated herein by reference in its entirety.

TECHNICAL FIELD

The disclosure relates generally to wireless communications and, more particularly, to systems and methods for reference signaling design and configuration.

BACKGROUND

Wireless communication service covers more and more applications. Efficient measurement and reporting of cells associated with various wireless communication devices increasingly important. However, conventional systems may not be able to effectively measure and report on cells associated with various wireless communication devices with conventional reference signaling. Thus, a technological solution for reference signaling design and communication is desired.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method performed by a wireless communication device includes receiving a downlink signaling indicating a power offset between a power of a synchronization signal and a power for a Channel State Information-Reference Signal (CSI-RS), and determining information of the synchronization signal.

In another embodiment, a method performed by a wireless communication device includes receiving a downlink signaling indicating information of a mobility measurement reference signal resource, where the information includes at least one of power information or repetition information.

In another embodiment, a method performed by a wireless communication device includes receiving a downlink signaling indicating cell-related information, and determining a neighboring cell for a Layer 1 (L1) measurement reporting, where the cell-related information comprises a physical cell index (PCI) of the determined neighboring cell.

In another embodiment, a method performed by a wireless communication device includes receiving a downlink signaling indicating mobility-related information for a Layer 1 (L1) measurement reporting.

In another embodiment, a method performed by a wireless communication device includes receiving a downlink signaling indicating a reference signal resource set of a neighboring cell.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 3 illustrates a method of reference signaling including indicating a power offset between power of a synchronization signal and a channel state information reference signal, in accordance with some embodiments of the present disclosure.

FIG. 4 illustrates a method of reference signaling including indicating information of a mobility measurement reference signal resource, in accordance with some embodiments of the present disclosure.

FIG. 8 illustrates a further method of reference signaling including indicating a power offset between power of a synchronization signal and a channel state information reference signal, in accordance with some embodiments of the present disclosure.

FIG. 9 illustrates a further method of reference signaling including indicating information of a mobility measurement reference signal resource, in accordance with some embodiments of the present disclosure.

FIG. 10 illustrates a further method of reference signaling including indicating a physical cell index of a neighboring cell, in accordance with some embodiments of the present disclosure.

FIG. 11 illustrates a further method of reference signaling including indicating mobility related information for Layer 1 measurement reporting, in accordance with some embodiments of the present disclosure.

FIG. 12 illustrates a further method of reference signaling including indicating a reference signal resource set of a neighboring cell, in accordance with some embodiments of the present disclosure.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

To speed up the mobility of UE, quick measurement reporting of neighboring cell is advantageous. As one example, if a gNodeB (gNB) configures a neighboring cell using Radio Resource Control (RRC), the gNB can be required to configure too many neighboring cells. In this example, the gNB cannot differentiate which neighboring cell is a good and available neighboring cell for a UE, leading to unnecessary signaling overhead. Further, the gNB can inform the neighboring cell after it receives a mobility reporting from a wireless communication device or user equipment (UE) and increasing latency. Thus, it is advantageous to reduce latency of signaling and to keep reasonable signaling overhead to inform neighboring cell information. It is further advantageous for the UE to report Layer 1 (L1) measurement for a neighboring cell informed by a gNB.

Figure 1:
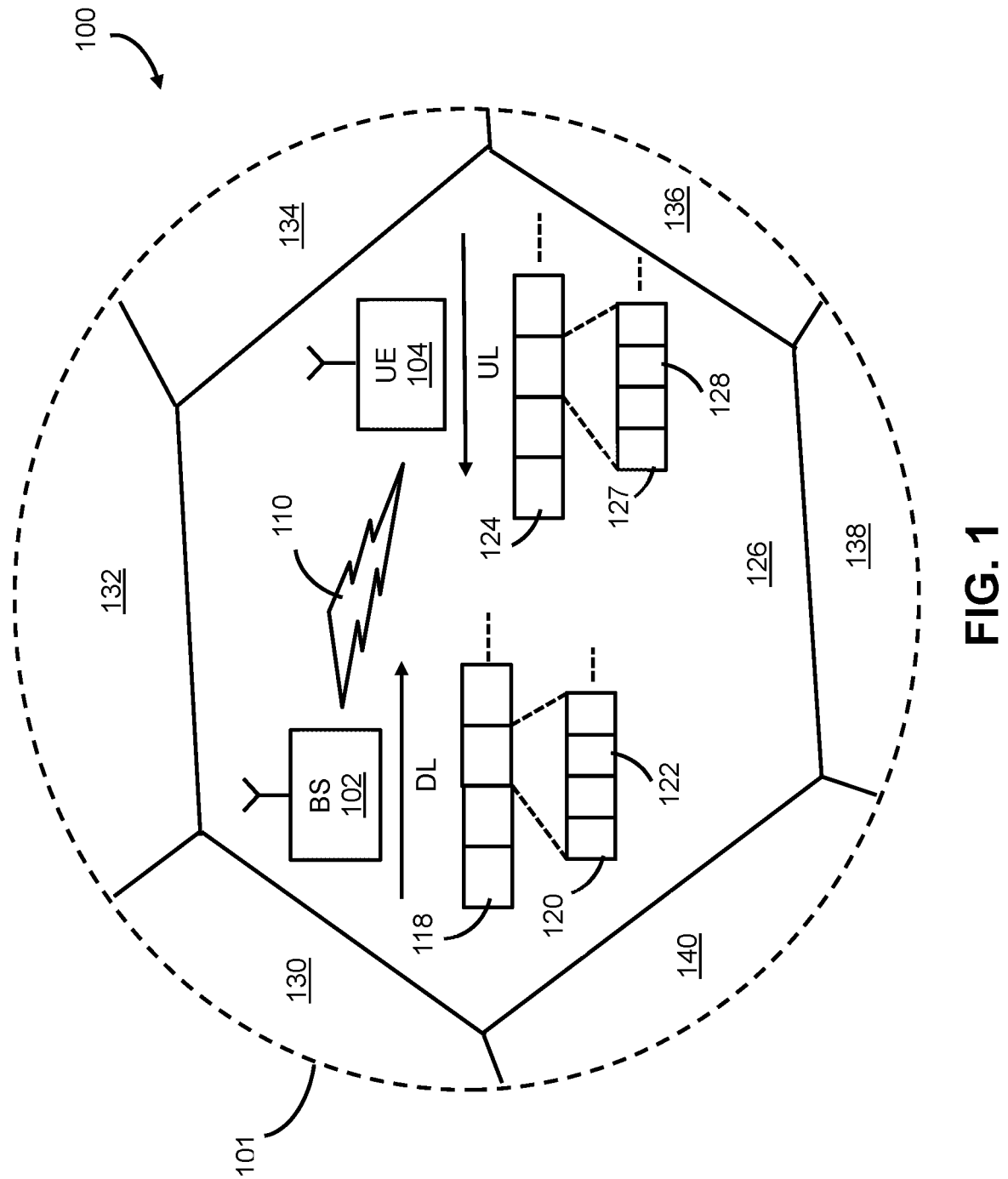
FIG. 1 illustrates an example cellular communication network in which techniques and other aspects disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
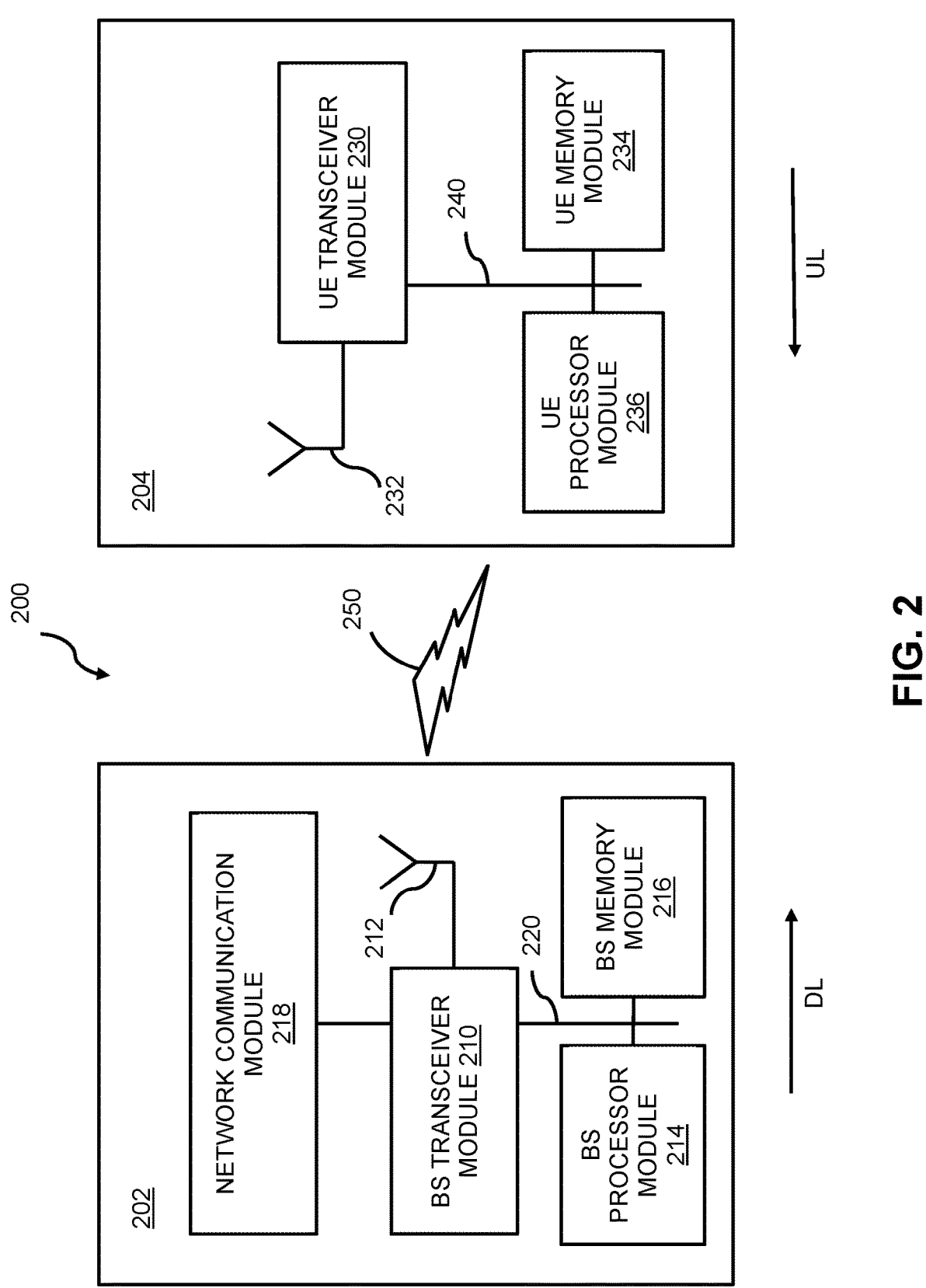
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., OFDM/OFDMA signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

FIG. 3 illustrates a method of reference signaling including indicating a power offset between power of a synchronization signal and a channel state information reference signal, in accordance with some embodiments of the present disclosure. In some implementations, at least one of the BS 202 and the UE 201 performs method 300 according to present implementations. Method 300 includes one or more of steps 310, 320, 322, 324, 326 and 328. It is to be understood that the method 300 includes or can include a subset of or all of steps 310, 320, 322, 324, 326 and 328.

In some implementations, the gNB configures power offset of NZP CSI-RS RE (resource element) to SSS (Secondary synchronization signal) RE for a NZP CSI-RS resource. The UE determines the third information of the SSS. The third information includes at least one of power, PCI, MeasObject, serving cell, frequency location. The third information of the SSS is the third information of a block of SS/PBCH corresponding to the SSS.

In some implementations, if the SS/PBCH is configured in a serving cell in which the NZP-CSI-RS is located, the third information of the SSS is got according to the third information of the SS/PBCH configured for the serving cell. For a serving cell of the NZP-CSI-RS without SS/PBCH configured, the UE determines that the third information of the SSS is the third information of the SS/PBCH configured for a Special serving cell, i.e. the Primary cell, or the Primary second cell of the cell group of the serving cell. Alternatively, the UE determines that the third information of the SSS is the third information of the SS/PBCH configured for a serving cell with SS/PBCH configuration in a serving cell group. Alternatively, the UE determines that the third information of the SSS is the third information of the SS/PBCH configured for any serving cell with SS/PBCH configuration in a Band of the serving cell of the CSI-RS; Alternatively, the UE determines that the third information of the SSS is the third information of the SS/PBCH configured for a serving cell with lowest serving cell index among serving cells with SS/PBCH configuration in a Band of the serving cell of the CSI-RS. If the serving cell (for example the serving cell of the NZP-CSI-RS or the Special cell) is associated with more than one group of SS/PBCHs with the third information, respectively, the UE determines the third information of the SSS according the third information of the SS/PBCH configured in a serving cell common configuration, such as ServingCellConfigureCommon or SIB. Alternatively, the gNB configures the power offset with the third information. Alternatively the, UE selects one group of the SS/PBCH from the more than one group, and the UE determines the third information of the SSS according the third information of the SS/PBCH associated with the selected group.

When the gNB configures the power offset with the third information, the gNB can configure the third information for each CSI-RS resource. The gNB can also configure the third information for a CSI-RS resource set, to associate each CSI-RS resource in the set with the same third information. In some implementations, the third information of a CSI-RS resource can be the third information of QCL-RS of the CSI-RS resource. In some implementations, the third information of a mobility CSI-RS resource can be the third information of the PCI corresponding to the mobility CSI-RS resource. In some implementations, the power offset is a ratio of NZP CSI-RS EPRE (Energy per resource element), e.g., power, to an SS/PBCH block EPRE. In some implementations, SS/PBCH block is an occasion of a physical broadcast channel (PBCH), PSS (Primary synchronization signal), and SSS in consecutive symbols FIG. 4 illustrates a method of reference signaling including indicating information of a mobility measurement reference signal resource, in accordance with some embodiments of the present disclosure. In some implementations, at least one of the BS 202 and the UE 201 performs method 400 according to present implementations. Method 400 includes one or more of steps 410, 420, 422, 424, 426 and 428. It is to be understood that the method 400 includes or can include a subset of or all of steps 410, 420, 422, 424, 426 and 428.

In some implementations, the gNB configures power information for a mobility reference signal resource. The power information can be configured for a mobility reference signal resource, or for a mobility reference signal resource set. Alternatively, for a PCI, the power of all mobility reference signal resources associated with the PCI is same.

In some implementations, the gNB configures repetition information for a mobility reference signal resource set. When the repetition is configure to be "on," the transmitting spatial domain filter of all the mobility measurement reference signal resources in the set is same. When the repetition is configure to be "off," the transmitting spatial domain filter of all the mobility measurement reference signal resources in the set is different. The gNB configures repetition information for PCI. All mobility reference signal resource associated with the PCI share the repetition information. In some implementations, the mobility reference signal resource set includes all mobility reference signal resources associated with the PCI.

Figure 5:
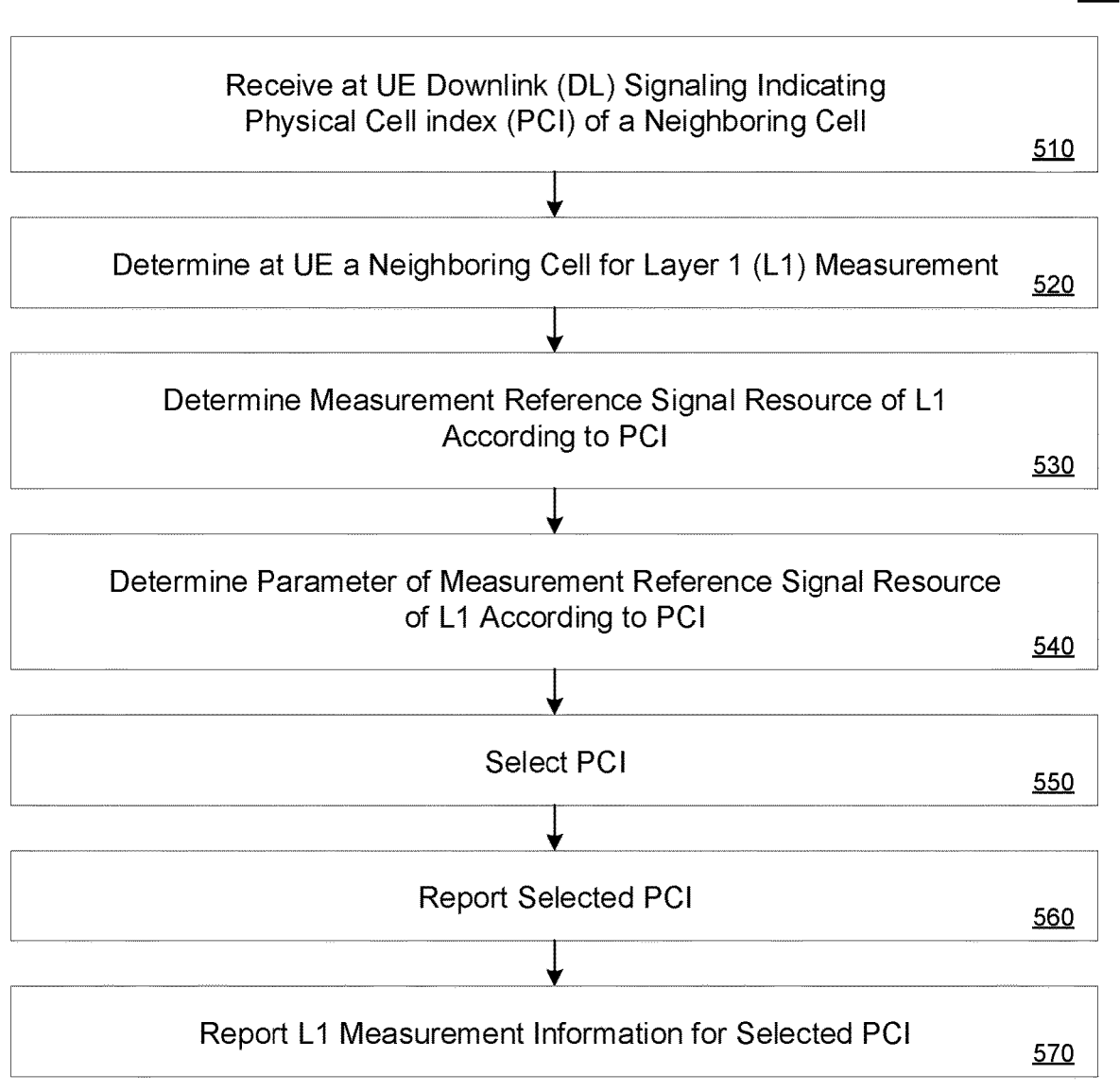
FIG. 5 illustrates a method of reference signaling including indicating a physical cell index of a neighboring cell, in accordance with some embodiments of the present disclosure.

FIG. 5 illustrates a method of reference signaling including indicating a physical cell index of a neighboring cell, in accordance with some embodiments of the present disclosure. In some implementations, at least one of the BS 202 and the UE 201 performs method 500 according to present implementations. Method 500 includes one or more of steps 510, 520, 530, 540, 550, 560 and 570. It is to be understood that the method 500 includes or can include a subset of or all of steps 510, 520, 530, 540, 550, 560 and 570.

In some implementations, the gNB informs UE first information for a L1 measurement information reporting or for a reference signal resource using a first signaling, where the first information includes a PCI (physical cell index), and the first signaling includes at least one of MAC-CE, and DCI. In some implementations, the first information can also include one of MeasObjectID, MeasID, and frequency information. The first information is about a neighboring cell. The PCI can be absolute value or a relative value. When it is a relative value, the PCI in the first signaling is the local index among a PCI set. The PCI set can be configured by the gNB using RRC. For example, the gNB transmits the first signaling to the UE. The first signaling is used to configure the first information for a CSI (channel state information) reporting, such as CSI-ReportConfigure. The first signaling also can be used to activate the CSI reporting associated with the CSI-ReortConfigure. In some implementations, the first signaling is also used to activate or deactivate the CSI reporting.

In some implementations, when the gNB configures the first information for a CSI-ReportConfigure using a first signaling, the UE gets CMR and IMR of the CSI-Report-Configure based on the reference signal resource configured in MeasObject and associated with the first information configured by first signaling, such as the reference signal resource for mobility. The UE ignores the CMR (Channel Measurements resource) and IMR (Interference Measurements resource) configured in the CSI-ReportConfigure. Alternatively, when the gNB configures the CSI-ReportConfigure using RRC signaling, the gNB does not configure CMR and/or IMR for this CSI-ReporConfigure. Alternatively, the reference signal resource index configured in the CSI-ReportConfigure by RRC is the index of reference signal resources for mobility configured in MeasObject. In some implementations, the UE is not aware of the PCI of the CMR and IMR, so the UE is not aware of the CMR and IMR by the RRC, because each PCI in a MeasObject can associated with a reference signal resource set. Then, the UE can get the CMR and IMR until the UE receives the MAC-CE and/DCI. The UE gets other parameters for the L1 measurement information reporting according to CSI-ReportConfigure, such as PUCCH resource, time domain behavior of the L1 measurement information reporting, report quantity and the like. In some implementations, the L1 measurement reporting is included in a UCI (uplink control information).

In some implementation, when the gNB configures the first information for a CSI-ReportConfigure using a first signaling, the UE gets the QCL reference signal resource for the CMR and/or IMR of the CSI-ReportConfigure. The QCL reference signal resource is a reference signal associated with the first information in some implementations. In some implementations, when the gNB configures the first information for a CSI-ReportConfigure using the first signaling, the UE gets the timing of the CMR and/or IMR of the CSI-ReportConfigure according to the first information.

The first signaling can include one or more pieces of the first information. When the first signaling includes more than one piece of the first information, the UE selects one piece of the first information, and reports both the L1 measurement information associated with the selected first information and the selected first information. In another implementation, when the first signaling includes more than one piece of the first information, the UE reports the L1 measurement result for each the first information.

Similarly, if the first signaling configures the first information for a reference signal resource, the UE gets the reference signal resource according to the first information. For example, the reference signal is the reference signal associated with the first information and configured in MeasObject. The UE can also get timing and/or a QCL reference signal resource of the reference signal according to the first information. The first signaling can also configure a reference signal resource set with a piece of the first information. In some implementations, the repetition of the reference signal resource set is configured with or as "on." In some implementations, the first signaling is also used to activate or deactivate the reference signal resource, such as CSI-RS, and SSB.

In some implementations, the L1 measurement information reporting isn't associated with any CSI-Reporting. Thus, in some implementations, the first signaling indicates to the UE the first information of a neighboring cell whose L1 measurement information needs to be reported to the gNB. The UE reports the L1 measurements information associated with the first information in a MAC-CE. The L1 measurement includes at least one of L1-SINR, L1-RSRP, CQI, and PMI. The L1 measurement associated with a piece of the first information is the L1 measurement of the cell of the first information, or is L1 measurement of a reference signal resource of the cell of the first information.

The L1 measurement information includes at least one of L1-SINR, L1-RSRP, CQI, PMI, and a reference signal resource index. The reference signal resource index in the L1 measurement information corresponds a piece of L1 measurement in the L1 measurement information. Alternatively, L1 measurement (such as L1-SINR, L1-RSRP, CQI, PMI) of the reference signal resource index in the L1 measurement information is not included in the L1 measurement information and is higher than a threshold.

Figure 6:
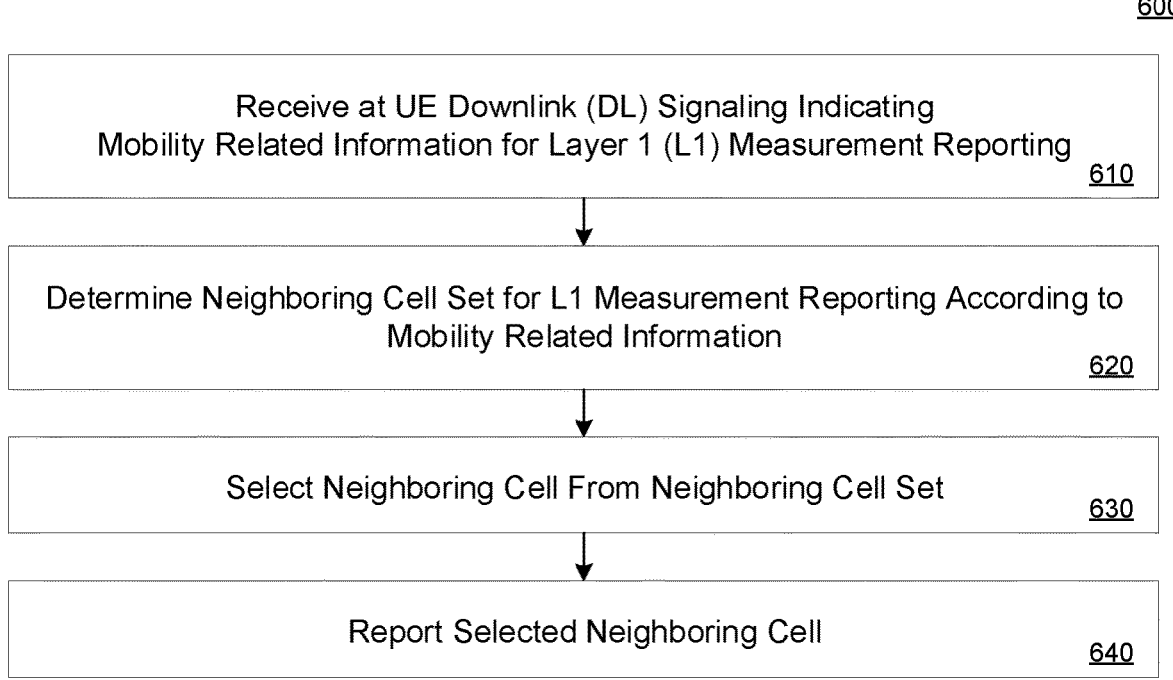
FIG. 6 illustrates a method of reference signaling including indicating mobility related information for Layer 1 measurement reporting, in accordance with some embodiments of the present disclosure.

The first signaling and the MAC-CE used to activated the SP CSI-Reporting can share the same LCID (logical channel identify), The LCID is in the MAC sub-header. The first signaling includes information to indicate which parameter set among two parameter sets is included in the first signaling. The first parameter set includes the first information. The second parameter includes Serving cell index, BWP index, and a CSI-Reporting index. The first parameter set can also include the first information and CSI-Reporting index. The index can be an integer or can be informed using a bit map to inform one than more index. In some implementations, the gNB configures the first information for an aperiodic L1 measurement information reporting or for a reference signal resource FIG. 6 illustrates a method of reference signaling including indicating mobility related information for Layer 1 measurement reporting, in accordance with some embodiments of the present disclosure. In some implementations, at least one of the BS 202 and the UE 201 performs method 600 according to present implementations. Method 600 includes one or more of steps 610, 620, 630 and 640. It is to be understood that the method 500 includes or can include a subset of or all of steps 610, 620, 630 and 640.

In some implementations, the gNB informs UE second information for L1 measurement information reporting, where the second information includes at least one of MeasID, MeasObject, and serving cell index. In some implementation, the UE selects one or more PCIs in a PCI set associated with the second information, and the UE reports the selected PCI and the L1 measurements information for each selected PCI. The PCI set associated with a serving cell is the PCI set associated with a MeasObject associated with the serving cell. The PCI set associated with a MeasObject is the PCI whose parameter is configured in the MeasObject. The gNB informs the UE of the second information using at least one of RRC signaling, MAC-CE signaling, or DCI. The RRC signaling/MAC-CE/DCI can inform more than one piece of the second information for more than one serving cell, or for more than one group of SSB in a serving cell.

Figure 7:
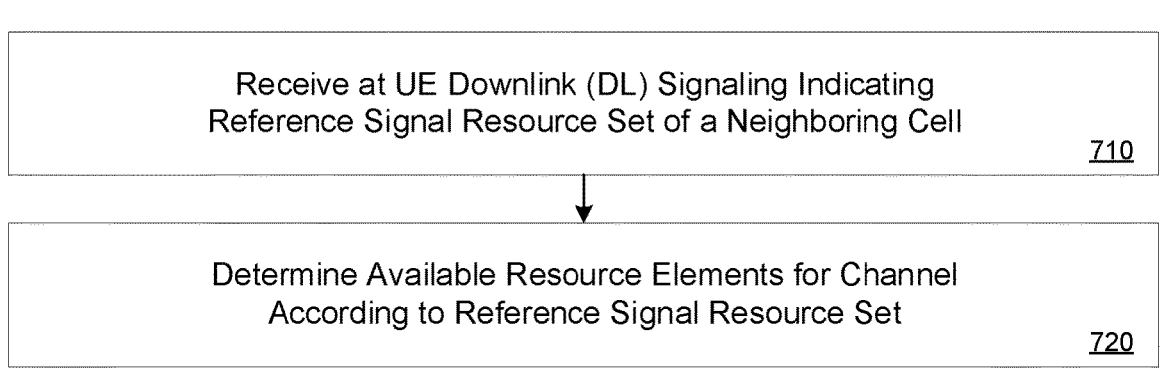
FIG. 7 illustrates a method of reference signaling including indicating a reference signal resource set of a neighboring cell, in accordance with some embodiments of the present disclosure.

FIG. 7 illustrates a method of reference signaling including indicating a reference signal resource set of a neighboring cell, in accordance with some embodiments of the present disclosure. In some implementations, at least one of the BS 202 and the UE 201 performs method 700 according to present implementations. Method 700 includes one or more of steps 710 and 720. It is to be understood that the method 700 includes or can include a subset of or all of steps 710 and 720.

The gNB configures a reference signal resource set of a neighboring cells using a MAC-CE. For example, the gNB configures an SSB group of the neighboring cells using the MAC-CE. The MAC-CE includes, for the SSB group, at least one of the first information, the SSB block select information (such as ssb-PositionsInBurst), periodicity, and power. The UE uses these SSBs to determine a measurement reference signal resource, or to determine the available resource element (i.e the available subcarrier) for a channel, wherein the channel include at least one of PDSCH, PDCCH, PUCCH, PUSCH.

In some implementations, the offset between the reception of the DL DCI and the corresponding PDSCH is less than the threshold timeDurationForQCL, and at least one configured TCI state for the serving cell of scheduled PDSCH contains the 'QCL-TypeD', the UE is configured with enableDefault-TCIStatePerCoresetPoolIndex-r16, and the UE is configured by a higher layer parameter PDCCH-Config that contains two different values of CORESETPoolIndex in different ControlResourceSets. Then, in some implementations, the UE assumes that the DM-RS ports of the PDSCH associated with a value of a CORESETPoolIndex of a serving cell are quasi co-located with the RS(s), with respect to the QCL parameter(s) used for a PDCCH quasi co-location indication of the CORESET associated with a monitored search space with the lowest controlResourceSetId among CORESETs. In some implementations, the CORESETs are configured with the same value of CORESETPoolIndex as the PDCCH scheduling that PDSCH, in the latest slot in which one or more CORESETs associated with the same value of CORESETPoolIndex as the PDCCH scheduling that PDSCH within the active BWP of the serving cell monitored by the UE. In this case, if the 'QCL-TypeD' of the PDSCH DM-RS is different from that of the PDCCH DM-RS with which they overlap in at least one symbol, and they are associated with same CORESETpoolindex, the UE is expected to prioritize the reception of PDCCH associated with that CORESET. This also applies to the intra-band CA case (when PDSCH and the CORESET are in different component carriers).

If the offset between the reception of the DL DCI and the corresponding PDSCH is less than the threshold timeDurationForQCL and at least one configured TCI state for the serving cell of scheduled PDSCH contains the 'QCL-TypeD' and If a UE is configured with enableTwoDefault-TCIStates-r16, and at least one TCI codepoint indicates two TCI states, the UE may assume that the DM-RS ports of PDSCH or PDSCH transmission occasions of a serving cell are quasi co-located with the RS(s) with respect to the QCL parameter(s) associated with the TCI states corresponding to the lowest codepoint among the TCI codepoints containing two different TCI states. When the UE is configured by higher layer parameter repetitionScheme-r16 set to 'TDMSchemeA' or is configured with higher layer parameter repetitionNumber-r16, the mapping of the TCI states to PDSCH transmission occasions is determined according to clause 5.1.2.1 by replacing the indicated TCI states with the TCI states corresponding to the lowest codepoint among the TCI codepoints containing two different TCI states based on the activated TCI states in the slot with the first PDSCH transmission occasion. In this case, if the 'QCL-TypeD' in both TCI states corresponding to the lowest codepoint among the TCI codepoints containing two different TCI states is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers).

FIG. 8 illustrates a further method of reference signaling including indicating a power offset between power of a synchronization signal and a channel state information reference signal, in accordance with some embodiments of the present disclosure. In some implementations, at least one of the BS 202 and the UE 201 performs method 800 according to present implementations. Method 800 includes one or more of steps 810 and 820. It is to be understood that the method 800 includes or can include a subset of or all of steps 800 and 820. In some implementations, one or more steps of the method 800 correspond to one or more steps or portions thereof of the method 300.

FIG. 9 illustrates a further method of reference signaling including indicating information of a mobility measurement reference signal resource, in accordance with some embodiments of the present disclosure. In some implementations, at least one of the BS 202 and the UE 201 performs method 900 according to present implementations. Method 900 includes one or more of steps 910 and 920. It is to be understood that the method 900 includes or can include a subset of or all of steps 910 and 920. In some implementations, one or more steps of the method 900 correspond to one or more steps or portions thereof of the method 400.

FIG. 10 illustrates a further method of reference signaling including indicating a physical cell index of a neighboring cell, in accordance with some embodiments of the present disclosure. In some implementations, at least one of the BS 202 and the UE 201 performs method 1000 according to present implementations. Method 1000 includes one or more of steps 1010 and 1020. It is to be understood that the method 1000 includes or can include a subset of or all of steps 1010 and 1020. In some implementations, one or more steps of the method 1000 correspond to one or more steps or portions thereof of the method 500.

FIG. 11 illustrates a further method of reference signaling including indicating mobility related information for Layer 1 measurement reporting, in accordance with some embodiments of the present disclosure. In some implementations, at least one of the BS 202 and the UE 201 performs method 1100 according to present implementations. Method 1100 includes step 1110. In some implementations, one or more steps of the method 1100 correspond to one or more steps or portions thereof of the method 600.

FIG. 12 illustrates a further method of reference signaling including indicating a reference signal resource set of a neighboring cell, in accordance with some embodiments of the present disclosure. In some implementations, at least one of the BS 202 and the UE 201 performs method 1200 according to present implementations. Method 1200 includes step 1210. In some implementations, one or more steps of the method 1200 correspond to one or more steps or portions thereof of the method 700.

Figure 13:
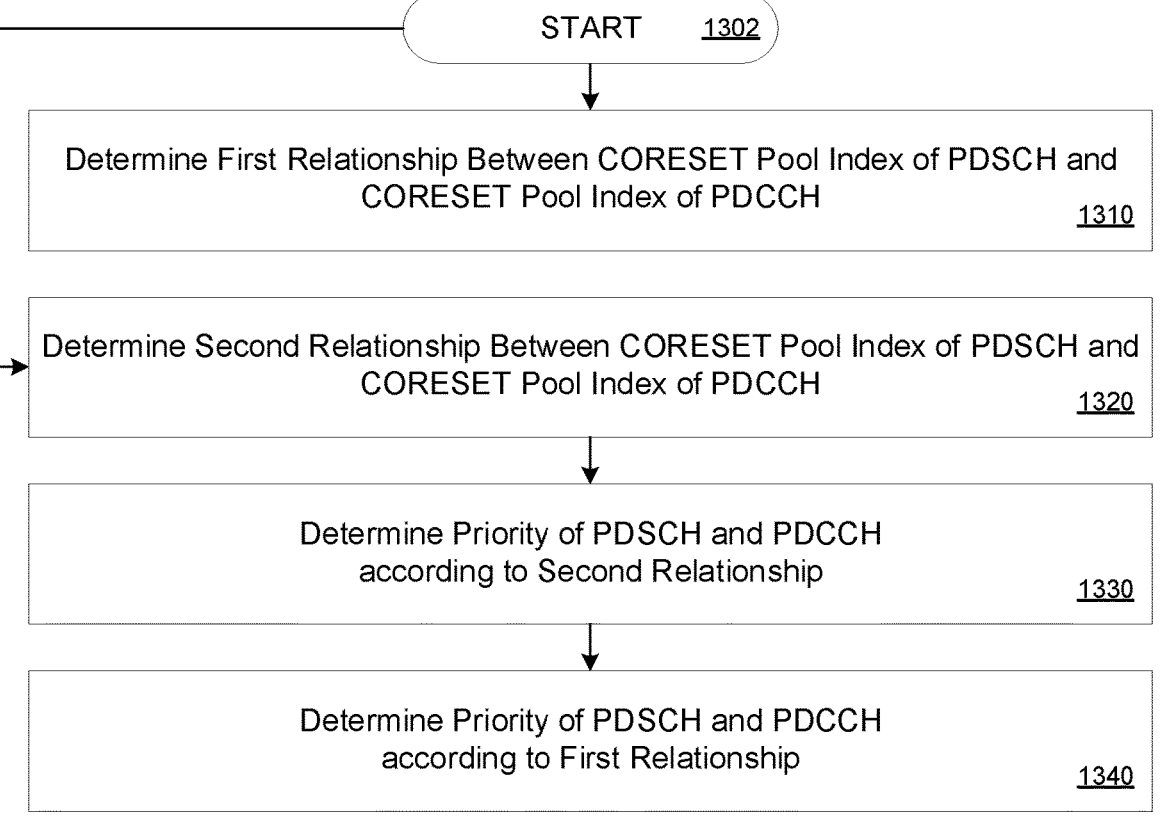
FIG. 13 illustrates a further method of reference signaling, in accordance with some embodiments of the present disclosure.

FIG. 13 illustrates a further method of reference signaling, in accordance with some embodiments of the present disclosure. In some implementations, at least one of the BS 202 and the UE 201 performs method 1300 according to present implementations. Method 1300 includes at least one of steps 1302, 1310, 1320, 1330 and 1340. In some implementations, one or more steps of the method 1300 correspond to one or more steps or portions thereof of at least one of the methods 300, 400, 500, 600 and 700.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit

13

14

(IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method, the method performed by a wireless communication device and comprising:
   receiving a downlink signaling from a wireless communication node, wherein the downlink signaling indicates a power offset between a power of a synchronization signal and a power for a Channel State Information-Reference Signal (CSI-RS), the synchronization signal comprising a secondary synchronization signal; and
   determining information of the synchronization signal according to a parameter of a Quasi-Colocation-Reference Signal (QCL-RS) of the CSI-RS, wherein the information includes a power of the secondary synchronization signal and a physical cell indicator (PCI) of the secondary synchronization signal.

2. The wireless communication method of claim 1, wherein when the synchronization signal belongs to a synchronization signal group of a plurality of synchronization signal groups, the wireless communication method further comprises:
   selecting the synchronization signal group from a plurality of synchronization signal groups for a serving cell; and
   determining the power of the synchronization signal as a power of a synchronization signal in the synchronization signal group, wherein each synchronization signal group of the plurality of synchronization signal groups is associated with a PCI and power information of a synchronization signal in the respective synchronization signal group.

3. The wireless communication method of claim 1, wherein the power offset is a ratio of non-zero-power (NZP) CSI-RS energy per resource element (EPRE) power to a synchronization signal block EPRE power.

4. A wireless communication device, comprising:
   at least one processor configured to:
   receive, via a receiver, a downlink signaling from a wireless communication node, wherein the downlink signaling indicates a power offset between a power of a synchronization signal and a power for a Channel State Information-Reference Signal (CSI-RS), the synchronization signal comprising a secondary synchronization signal; and
   determine information of the synchronization signal according to a parameter of a Quasi-Colocation-Reference Signal (QCL-RS) of the CSI-RS, wherein the information includes a power of the secondary synchronization signal and a physical cell indicator (PCI) of the secondary synchronization signal.

5. The wireless communication device of claim 4, wherein when the synchronization signal belongs to a synchronization signal group of a plurality of synchronization signal groups, the at least one processor is configured to:
   select the synchronization signal group from a plurality of synchronization signal groups for a serving cell; and
   determine the power of the synchronization signal as a power of a synchronization signal in the synchronization signal group, wherein each synchronization signal group of the plurality of synchronization signal groups is associated with a PCI and power information of a synchronization signal in the respective synchronization signal group.

6. The wireless communication device of claim 4, wherein the power offset is a ratio of non-zero-power (NZP) CSI-RS energy per resource element (EPRE) power to a synchronization signal block EPRE power.

7. A wireless communication method, the wireless communication method performed by a wireless communication node and comprising:

sending, to a wireless communication device, a downlink signaling from the wireless communication node, wherein the downlink signaling indicates a power offset between a power of a synchronization signal and a power for a Channel State Information-Reference Signal (CSI-RS), the synchronization signal comprising a secondary synchronization signal, wherein the wireless communication device determines information of the synchronization signal according to a parameter of a Quasi-Colocation-Reference Signal (QCL-RS) of the CSI-RS, wherein the information includes a power of the secondary synchronization signal and a physical cell indicator (PCI) of the secondary synchronization signal.

8. The wireless communication method of claim 7, wherein when the synchronization signal belongs to a synchronization signal group of a plurality of synchronization signal groups, the wireless communication device:

selects the synchronization signal group from a plurality of synchronization signal groups for a serving cell; and determines the power of the synchronization signal as a power of a synchronization signal in the synchronization signal group, wherein each synchronization signal group of the plurality of synchronization signal groups is associated with a PCI and respective power information of a synchronization signal in the respective synchronization signal group.

9. The wireless communication method of claim 7, wherein the power offset is a ratio of non-zero-power (NZP) CSI-RS energy per resource element (EPRE) power to a synchronization signal block EPRE power.

10. A wireless communication node, comprising:

at least one processor configured to:

send, via a transmitter to a wireless communication device, a downlink signaling from the wireless communication node, wherein the downlink signaling indicates a power offset between a power of a synchronization signal and a power for a Channel State Information- Reference Signal (CSI-RS), the synchronization signal comprising a secondary synchronization signal, wherein the wireless communication device determines information of the synchronization signal according to a parameter of a Quasi-Colocation-Reference Signal (QCL-RS) of the CSI-RS, wherein the information includes a power of the secondary synchronization signal and a physical cell indicator (PCI) of the secondary synchronization signal.

11. The wireless communication node of claim 10, wherein when the synchronization signal belongs to a synchronization signal group of a plurality of synchronization signal groups, the wireless communication device:

selects the synchronization signal group from a plurality of synchronization signal groups for a serving cell; and determines the power of the synchronization signal as a power of a synchronization signal in the synchronization signal group, wherein each synchronization signal group of the plurality of synchronization groups is associated with a PCI and respective power information of a synchronization signal in the respective synchronization signal group.

12. The wireless communication node of claim 10, wherein the power offset is a ratio of non-zero-power (NZP) CSI-RS energy per resource element (EPRE) power to a synchronization signal block EPRE power.

* * * * *